(12) United States Patent
Koskinen et al.

(10) Patent No.: US 11,737,145 B2
(45) Date of Patent: Aug. 22, 2023

(54) EARLY DATA TRANSMISSION DETERMINATIONS USING AN UPLINK GRANT

(71) Applicant: NOKIA TECHNOLOGIES OY, Espoo (FI)

(72) Inventors: Jussi-Pekka Koskinen, Oulu (FI); Samuli Turtinen, Ii (FI); Hua Chao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/767,476

(22) PCT Filed: Nov. 28, 2017

(86) PCT No.: PCT/CN2017/113283
§ 371 (c)(1),
(2) Date: May 27, 2020

(87) PCT Pub. No.: WO2019/104459
PCT Pub. Date: Jun. 6, 2019

(65) Prior Publication Data
US 2020/0374934 A1 Nov. 26, 2020

(51) Int. Cl.
*H04W 74/08* (2009.01)
*H04W 76/25* (2018.01)
*H04W 76/27* (2018.01)
(Continued)

(52) U.S. Cl.
CPC ....... *H04W 74/0833* (2013.01); *H04W 72/23* (2023.01); *H04W 76/25* (2018.02); *H04W 76/27* (2018.02)

(58) Field of Classification Search
CPC . H04W 74/0833; H04W 76/25; H04W 76/27; H04W 72/1289; H04W 72/1226;
(Continued)

(56) References Cited

U.S. PATENT DOCUMENTS

2009/0259910 A1  10/2009  Lee et al.
2015/0282213 A1*  10/2015  Sun .................. H04W 72/0413
                                                370/329
(Continued)

FOREIGN PATENT DOCUMENTS

CN       103795511 A       5/2014
WO    WO 2017150601 A1 *  9/2017
(Continued)

OTHER PUBLICATIONS

International Search Report and Written Opinion for Application No. PCT/CN2017/113283 dated Aug. 1, 2018, 7 pages.
(Continued)

*Primary Examiner* — Rushil P. Sampat
(74) *Attorney, Agent, or Firm* — Alston & Bird LLP (57) ABSTRACT

A method, an apparatus and a computer readable medium ae disclosed for early data transmission determinations using an uplink grant. The method includes obtaining Radio Resource Control (RRC) signaling to be transmitted to a network device and data to be transmitted with the RRC signaling. The method also includes, in response to receiving a Random Access Response with uplink grant from the network device, determining, based on the uplink grant, whether the data is allowed to be transmitted with the RRC signaling. In addition, the method also includes, in response to determining whether the data is allowed to be transmitted with the RRC signaling, generating a media access control (MAC) packet data unit (PDU) and transmitting the MAC PDU the network device.

20 Claims, 3 Drawing Sheets

(51) Int. Cl.
*H04W 72/12* (2009.01)
*H04W 72/23* (2023.01)

(58) Field of Classification Search
CPC ............. H04W 72/04; H04W 74/0816; H04W 72/0446; H04W 72/1205; H04W 72/1268; H04W 72/1284; H04L 5/0053
See application file for complete search history.

(56) References Cited

U.S. PATENT DOCUMENTS

| | | | |
|---|---|---|---|
| 2017/0302421 A1 | 10/2017 | Hsu et al. | |
| 2017/0318606 A1 | 11/2017 | Lee et al. | |
| 2018/0302929 A1* | 10/2018 | Takahashi | H04W 74/0833 |
| 2019/0090277 A1* | 3/2019 | Yi | H04W 28/0268 |
| 2019/0223221 A1* | 7/2019 | Johansson | H04W 68/02 |
| 2019/0254077 A1* | 8/2019 | Sahlin | H04L 5/0037 |
| 2019/0394808 A1* | 12/2019 | Lee | H04W 74/0833 |
| 2020/0008241 A1* | 1/2020 | Zhou | H04W 74/0816 |
| 2020/0221501 A1* | 7/2020 | Han | H04L 1/1896 |

FOREIGN PATENT DOCUMENTS

| | | |
|---|---|---|
| WO | WO 2017164658 A2 * | 9/2017 |
| WO | WO 2017185998 A1 * | 11/2017 |
| WO | WO 2018083662 A1 * | 5/2018 |
| WO | WO 2019028965 A1 * | 2/2019 |

OTHER PUBLICATIONS

Extended European Search Report for European Application No. 17933274.7 dated Jun. 21, 2021, 6 pages.

Qualcomm Incorporated, "Email Discussion Report: [99#45][NB-IoT/MTC] Early Data Transmission", 3GPP TSG-RAN WG2 Meeting #99bis, R2-1710888, (Oct. 9-13, 2017), 42 pages.

Office Action for Chinese Application No. 201780098149.X dated Aug. 30, 2022, 16 pages.

Office Action for European Application No. 17933274.7 dated Feb. 16, 2023, 5 pages.

* cited by examiner

Fig. 5

EARLY DATA TRANSMISSION DETERMINATIONS USING AN UPLINK GRANT

CROSS-REFERENCE TO RELATED APPLICATIONS

This application is a national phase entry of International Application No. PCT/CN2017/113283, filed Nov. 28, 2017, the entire contents of which are incorporated herein by reference.

TECHNICAL FIELD

Embodiments of the present disclosure generally relate to the field of telecommunication, and in particular, to a method, an apparatus and a computer readable medium for early data transmission.

BACKGROUND

In early specifications of 3GPP, an optimization scheme for Cellular Internet of Thing (CIoT) Evolved Packet System (EPS) is provided, including Control Plane (CP) CIoT EPS optimization and User Plane (UP) CIoT EPS optimization. In 3GPP REL-15, a new technology, called "Early Data Transmission (EDT)", is being standardized due to its potential characteristics like low latency and low power consumption. EDT refers to data transmission during the random access procedure and before the Radio Resource Control (RRC) connection is established. It is intended to support EDT in MSG3 (such as, RRC Connection Request, RRC Resume Request, and so on) for both CP CIoT EPS optimization and UP CIoT EPS optimization.

Traditionally, a terminal device prepares the MSG3 before an UL grant is provided in a Random Access Response (MSG2), since the MSG3 only includes RRC signaling and the minimum allowable size for UL transmission is predefined in the 3GPP specification. The MSG3 can be carried in a Common Control Channel (CCCH) Service Data Unit (SDU) before being processed in MAC layer.

However, for EDT, the MSG3 may include the RRC signaling and early data to be transmitted with the RRC signaling. Before receiving the MSG2 with the UL grant, the terminal device may not know whether the MSG3 with the early data can be transmitted. For example, the allowable size for UL transmission indicated by the UL grant in the MSG2 may not accommodate the MSG3 with the early data. In this event, the terminal device cannot prepare the MSG3 as before. On the other hand, the MSG3 cannot be prepared after the UL grant is received in MSG2, since there may be not enough time for the preparation of the MSG3.

Some prior solutions propose to specify two MSG3 buffers in the MAC layer for UL EDT. The MAC layer can load either of them in the subsequent Hybrid Automatic Repeat request (HARQ) buffer based on the allowable size for UL transmission indicated by the UL grant in the MSG2. However, these solutions do not specify how to prepare the MSG3 in the MAC layer. Moreover, since the HARQ buffer is associated with the MSG3 buffer in the MAC layer, two MSG3 buffers may necessarily introduce extra complexity for buffer management and introduce errors in HARQ processing.

SUMMARY

In general, example embodiments of the present disclosure provide a method, an apparatus and a computer readable medium for early data transmission.

In a first aspect, there is provided a method implemented at a terminal device is provided. The method comprises obtaining Radio Resource Control (RRC) signaling to be transmitted to a network device and data to be transmitted with the RRC signaling. The method also comprises, in response to receiving a Random Access Response with uplink grant from the network device, determining, based on the uplink grant, whether the data is allowed to be transmitted with the RRC signaling. The method further comprises, in response to receiving a Random Access Response with uplink grant from the network device, determining, based on the uplink grant, whether the data is allowed to be transmitted with the RRC signaling. In addition, the method also comprises, in response to determining that the data is not allowed to be transmitted with the RRC signaling, transmitting the RRC signaling to the network device.

In a second aspect, there is provided a terminal device. The terminal device includes a processor; and a memory coupled to the processing unit and storing instructions thereon, the instructions, when executed by the processing unit, causing the terminal device to perform actions. The actions comprise obtaining Radio Resource Control (RRC) signaling to be transmitted to a network device and data to be transmitted with the RRC signaling. The actions also comprise, in response to receiving a Random Access Response with uplink grant from the network device, determining, based on the uplink grant, whether the data is allowed to be transmitted with the RRC signaling. The actions further comprise, in response to receiving a Random Access Response with uplink grant from the network device, determining, based on the uplink grant, whether the data is allowed to be transmitted with the RRC signaling. In addition, the actions also comprise, in response to determining that the data is not allowed to be transmitted with the RRC signaling, transmitting the RRC signaling to the network device.

In a third aspect, there is provided a computer readable medium having instructions stored thereon. The instructions, when executed on at least one processor, cause the at least one processor to carry out the method according to the first aspect.

In a fourth aspect, there is provided a computer program product that is tangibly stored on a computer readable storage medium. The computer program product includes instructions which, when executed on at least one processor, cause the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device. Specifically, in some embodiments, the UE can be a Narrow Band-Internet of Things (NB-IoT) UE.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
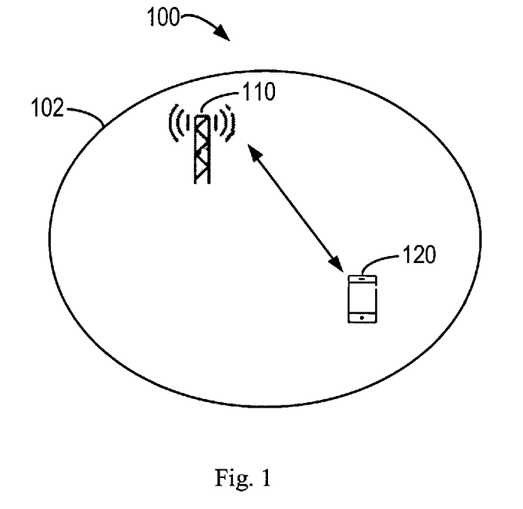
FIG. 1 shows a block diagram of a communication environment in which embodiments of the present disclosure can be implemented.

FIG. 1 shows an example communication network 100 in which embodiments of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be located in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
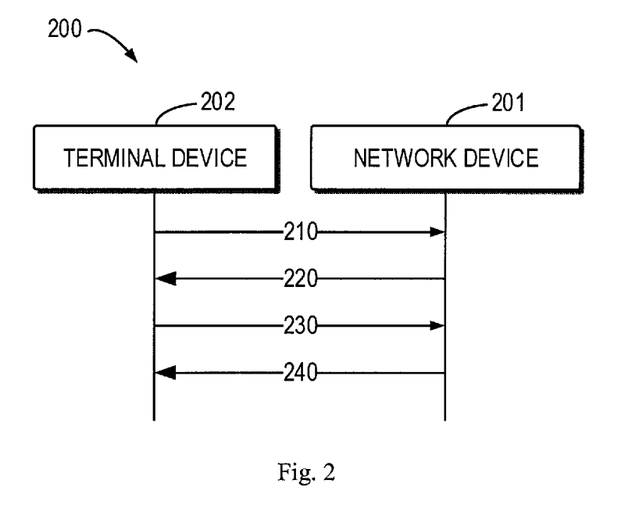
FIG. 2 shows a schematic of a contention-based random access procedure 200 in LTE.

For initial access to the network device 110, the terminal device 120 may initiate a random access procedure. FIG. 2 shows a schematic of a contention-based random access procedure 200 in LTE. The random access procedure 200 may involve a network device 201 and a terminal device 202 served by the network device 201.

The terminal device 202 starts the random access procedure 200 by transmitting (210) a Random Access Preamble (MSG1) on Physical Random Access Channel (PRACH) to the network device 201. The network device 201 acknowledges the preamble it detects by transmitting (220) a Random Access Response (MSG2), which includes an UL grant for Uplink Shared Channel (UL-SCH), a temporary Cell Radio Network Temporary Identification (C-RNTI) for the terminal device 202, and a time advance (TA) update. The UL grant in the MSG2 indicates an allowable size for MSG3. After receiving the Random Access Response (MSG2), the terminal device 202 transmits (230), based on the UL grant, the MSG3 back to the network device 201 on UL-SCH. The MSG3 can be used to trigger the establishment of RRC connection and to uniquely identify the terminal device 202 on the common channels of a cell. The procedure 200 ends with the network device 201 solving any preamble contention that may have occurred in case that multiple terminal devices transmit the same preamble at the same time. The network device 201 resolves such contention by transmitting (240) a contention resolution message (MSG4) on Downlink Shared Channel (DL-SCH).

Traditionally, the terminal device 202 prepares the MSG3 before the UL grant is provided in the MSG2, since the MSG3 only includes RRC signaling and the minimum allowable size for UL transmission is predefined in the 3GPP specification. The MSG3 can be carried in a CCCH SDU before being processed in MAC layer. However, for EDT, the MSG3 may include the RRC signaling and early data to be transmitted with the RRC signaling. Before receiving the MSG2 with the UL grant, the terminal device 202 may not know whether the MSG3 with the early data can be transmitted. For example, the allowable size for UL transmission indicated by the UL grant in the MSG2 may not accommodate the MSG3 with the early data. In this event, the terminal device 202 cannot prepare the MSG3 as before.

As described above, some prior solutions propose to specify two MSG3 buffers in the MAC layer for UL EDT. The MAC layer can load either of them in the subsequent HARQ buffer based on the allowable size for UL transmission indicated by the UL grant in the MSG2. However, these solutions do not specify how to prepare the MSG3 in the MAC layer. Moreover, since the HARQ buffer is associated with the MSG3 buffer in the MAC layer, two MSG3 buffers may necessarily introduce extra complexity for buffer management and introduce errors in HARQ processing.

In this event, a solution for EDT is proposed. This solution can support EDT in MSG3 for both CP CIoT EPS optimization and UP CIoT EPS optimization. This solution can be used in Narrow Band-Internet of Things (NB-IoT) and Machine Type Communication (MTC) by utilizing the characteristics of EDT like low latency and low power consumption. In the following descriptions, some embodiments will be described with reference to UL EDT as an example of EDT. It is to be understood that this is only for the purpose of illustration, without suggesting any limitations to the present disclosure.

Principle and embodiments of the present disclosure will be described in detail below with reference to FIG. 3, which shows a method 300 for UL EDT according to some embodiments of the present disclosure. The method 300 can be performed at a terminal device, for example, the terminal device 120 as shown in FIG. 1. In some embodiments, the method 300 can be performed at the MAC layer of the terminal device 120. FIG. 4 shows a schematic diagram of a MAC entity 400 of a terminal device 120 according to some embodiments of the present disclosure. For example, the method 300 can be performed at the MAC entity 400 in FIG. 4.

As shown in FIG. 4, the MAC entity 400 may include a plurality of function parts associated with UL EDT. These function parts associated with UL EDT may include, but not limited to, a multiplexing and assembly part 412, a logical channel prioritization part 411 and a control part 413. The multiplexing and assembly part 412 may multiplex/assemble a plurality of MAC SDUs (from a same logical channel or different logical channels) into a transport block (TB) and send it to a lower layer 420 over a transport channel. That is, the multiplexing and assembly part 412 can map one or more logical channels (such as, CCCH, DTCH and Dedicated Control Channel (DCCH)) to the transport channel (such as, UL-SCH). The logical channel prioritization part 411 may be used for UL only, which can prioritize different logical channels for the terminal device 120. The control part 413 may be used to control all other function parts, such as the multiplexing and assembly part 412, the logical channel prioritization part 411 and so on.

It is to be understood the function parts included in the MAC entity 400 are only shown for the purpose of illustration without suggesting any limitations to the present disclose. For example, the MAC entity 400 may include additional function parts not shown or omit some function parts as shown. The scope of the present disclosure is not limited in this regard.

For the purpose of discussion, the method 300 will be described with reference to FIGS. 1 and 4 in the following.

It is to be understood that the method 300 may include additional blocks not shown and/or may omit some blocks as shown, and the scope of the present disclosure is not limited in this regard.

In block 310, the terminal device 120 obtains RRC signaling to be transmitted to the network device 110 and data to be transmitted with the RRC signaling. In some embodiments, the RRC signaling may include, but not limited to, RRC Connection Request, RRC Resume Request, or some other RRC signaling to be developed in the future. In some embodiments, the data to be transmitted with the RRC signaling may be encapsulated in the RRC signaling as one of information elements thereof (such as, for UL EDT in the control plain as further described in the following). Alternatively, in some other embodiments, the data to be transmitted with the RRC signaling and the RRC signaling may be included in different MAC SDUs, respectively (such as, for UL EDT in the user plain as further described in the following).

In some embodiments, for UL EDT in the control plain, two different CCCH SDUs can be prepared for MSG3 before the MSG2 with UL grant is received. For example, prior to receiving the MSG2 with UL grant from the network device 110, a CCCH SDU (also called "first CCCH SDU") including the RRC signaling and a CCCH SDU (also called "second CCCH SDU") including the RRC signaling and the data to be transmitted with the RRC signaling can be generated at an upper layer 410 as shown in FIG. 4. In some embodiments, the MAC entity 400 may obtain, from the upper layer 410, the first and second CCCH SDUs.

Alternatively, in some other embodiments, for UL EDT in the user plain, two different MAC SDUs can be prepared for MSG3 before the MSG2 with UL grant is received. For example, prior to receiving the MSG2 with UL grant from the network device 110, a CCCH SDU (also called "third CCCH SDU") including the RRC signaling and a Dedicated Traffic Channel (DTCH) SDU including the data to be transmitted with the RRC signaling can be generated at the upper layer 410 as shown in FIG. 4. In some embodiments, the MAC entity 400 may obtain, from the upper layer 410, the third CCCH SDU and the DTCH SDU.

In block 320, the terminal device 120 determines a Random Access Response with UL grant is received from the network device 110. If the Random Access Response with UL grant is received from the network device 110, in block 330, the terminal device 120 determines, based on the UL grant, whether the data is allowed to be transmitted with the RRC signaling. Otherwise, if the Random Access Response with UL grant is not received from the network device 110, the method 300 proceeds to block 320.

In some embodiments, the UL grant may indicate an allowable size for MSG3. The terminal device 120 (for example, the MAC entity 400 as shown in FIG. 4) may determine a total size of the RRC signaling and the data, that is, the size of the MSG3 with the early data. If the total size does not exceed the allowable size, the terminal device 120 may determine that the data is allowed to be transmitted with the RRC signaling. If the total size exceeds the allowable size, the terminal device 120 may determine that the data is not allowed to be transmitted with the RRC signaling.

If it is determined that the data is allowed to be transmitted with the RRC signaling, in block 340, the terminal device 120 transmits the RRC signaling and the data to the network device 110. Otherwise, if it is determined that the data is not allowed to be transmitted with the RRC signaling, in block 350, the terminal device 120 transmits only the RRC signaling to the network device 110.

In some embodiments, for UL EDT in the control plain, if the UL grant indicates that the data is not allowed to be transmitted in MSG3, the multiplexing and assembly entity 403 in the MAC entity 400 may be configured to generate a MAC Packet Data Unit (also called "first MAC PDU") based on the first CCCH SDU including only the RRC signaling, and the second SDU may be deleted. If the allowable size indicated by the UL grant exceeds the size of the first CCCH SDU, paddings may be appended to the end of the first MAC PDU. The first MAC PDU can be further sent to the lower layer 420 over UL-SCH, so as to be transmitted to the network device 110.

Alternatively, in some embodiments, for UL EDT in the control plain, if the UL grant indicates that the data is allowed to be transmitted in MSG3, the multiplexing and assembly entity 403 in the MAC entity 400 may be configured to generate a MAC PDU (also called "second MAC PDU") based on the second CCCH SDU including the RRC signaling and the data, and the first CCCH SDU may be deleted. As such, the data will be encapsulated in the RRC signaling as one of information elements thereof. If the allowable size indicated by the UL grant exceeds the size of the second CCCH SDU, paddings may be appended to the end of the second MAC PDU. The second MAC PDU can be further sent to the lower layer 420 over UL-SCH, so as to be transmitted to the network device 110.

In some other embodiments, for UL EDT in the user plane, if the UL grant indicates that the data is not allowed to be transmitted in MSG3, the multiplexing and assembly entity 403 in the MAC entity 400 may only use CCCH (that is, a logical channel 401 as shown in FIG. 4) to generate a MAC PDU (also called "third MAC PDU") for UL transmission. That is, the multiplexing and assembly entity 403 may generate the third MAC PDU based on the third CCCH SDU including the RRC signaling. The third MAC PDU can be further sent to the lower layer 420 over UL-SCH, so as to be transmitted to the network device 110.

Alternatively, for UL EDT in the user plane, if the UL grant indicates that the data is allowed to be transmitted in MSG3, the multiplexing and assembly part 403 in the MAC entity 400 as shown in FIG. 4 may be configured to generate a MAC PDU (also called "fourth MAC PDU") for UL transmission by multiplexing CCCH (that is, the logical channel 401 as shown in FIG. 4) and DTCH (that is, logical channel(s) 402 as shown in FIG. 4). That is, the multiplexing and assembly entity 403 may generate the fourth MAC PDU based on the third CCCH SDU including the RRC signaling and the DTCH SDU including the data. The fourth MAC PDU can be further sent to the lower layer 420 over UL-SCH, so as to be transmitted to the network device 110.

Alternatively or in addition, in some embodiments, the UL grant can also be indicated to the logical channel prioritization part 411, such that different logical channels can be prioritized by the logical channel prioritization part 411 based on the UL grant prior to being multiplexed/assembled by the multiplexing and assembly part 403.

Through the above depiction, it can be seen that actually two schemes of UL EDT for CP CIoT EPS optimization and UP CIoT EPS optimization are provided according to embodiments of the present disclosure. In different cases, a terminal device may select either of the two solutions to perform the early data transmission in MSG3. For example, with the scheme for UL EDT in the control plane, if the Random Access Response (MSG2) includes an UL grant for EDT, the multiplexing and assembly part of the MAC entity of the terminal device may delete the CCCH SDU (that is, the first CCCH SDU) without the data to be transmitted with the RRC signaling. With the scheme for UL EDT in the user plane, if the Random Access Response (MSG2) includes an UL grant for EDT, the multiplexing and assembly part of the MAC entity of the terminal device may create the MAC PDU (that is, the fourth MAC PDU) by multiplexing CCCH and DTCH. In this way, the RRC signaling and the UL data can be multiplexed into the MSG3 as different MAC SDUs.

With considering how to prepare the MSG3 for EDT in terms of MAC PDU preparation, embodiments of the present disclosure can solve the special problem faced by UL EDT as described above. Moreover, the MSG3 can be still prepared before the MSG2 is received, but the content of the MSG3 to be sent to the lower layer depends on the UL grant in the MSG2. In addition, no additional MSG3 buffer is needed, thereby reducing the complexity for buffer management as compared with some prior solutions. By utilizing the characteristics of EDT like low latency and low power consumption, embodiments of the present disclosure are applicable to NB-IoT and MTC.

Figure 5:
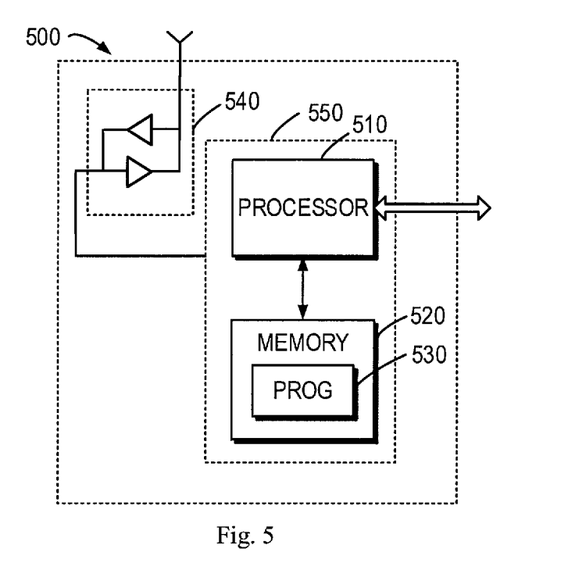
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example embodiment of a network device 110 or a terminal device 120 as shown in FIG. 1. Accordingly, the device 500 can be implemented at or as at least a part of the network device 110 or the terminal device 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

Figure 3:
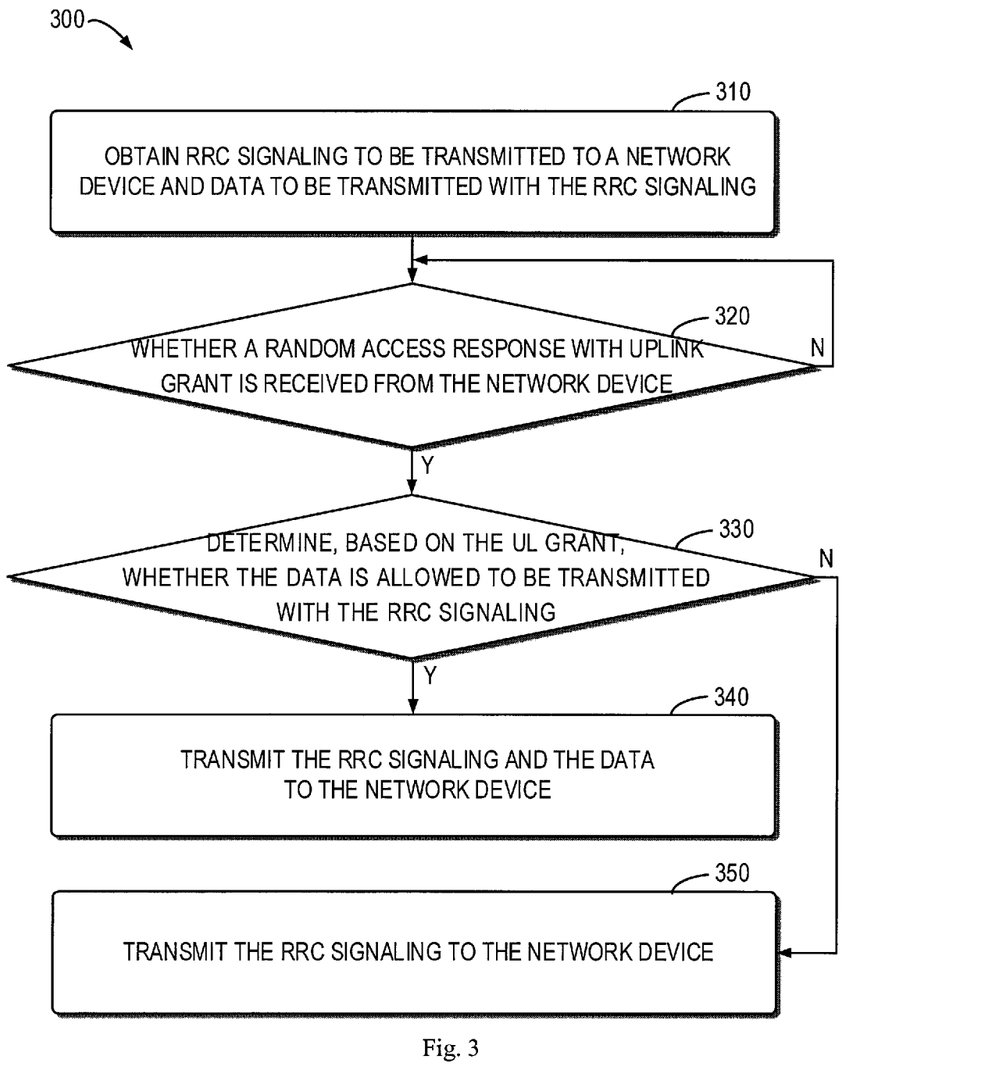
FIG. 3 shows a flowchart of an example method in accordance with some embodiments of the present disclosure.
Figure 4:
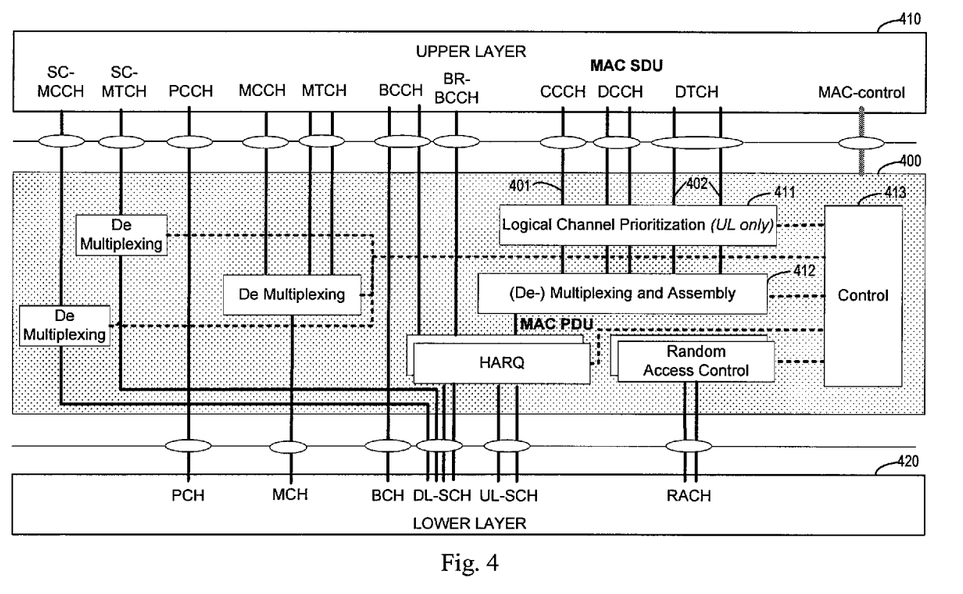
FIG. 4 shows a schematic diagram of a MAC entity of a terminal device in accordance with some embodiments of the present disclosure.

The program 530 is assumed to include program instructions that, when executed by the associated processor 510, enable the device 500 to operate in accordance with the embodiments of the present disclosure, as discussed herein with reference to FIGS. 2 to 4. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
    obtaining Radio Resource Control (RRC) signaling to be transmitted to a network device and data for early data transmission (EDT) to be transmitted with the RRC signaling;
    in response to receiving a Random Access Response with uplink grant from the network device, determining, based on the uplink grant, whether the data for the EDT is allowed to be transmitted with the RRC signaling; and
    in response to determining that the data for the EDT is allowed to be transmitted with the RRC signaling, transmitting the RRC signaling and the data for the EDT to the network device by preparing a Media Access Control (MAC) Packet Data Unit (PDU) in accordance with a size of the MAC PDU; or
    in response to determining that the data for the EDT is not allowed to be transmitted with the RRC signaling, transmitting the RRC signaling to the network device.

2. The method of claim 1, wherein the uplink grant indicates an allowable size for uplink transmission, and determining whether the data for the EDT is allowed to be transmitted with the RRC signaling comprises:
  determining a total size of the RRC signaling and the data for the EDT; in response to the total size being below the allowable size, determining that the data for the EDT is allowed to be transmitted with the RRC signaling; and
  in response to the total size exceeding the allowable size, determining that the data for the EDT is not allowed to be transmitted with the RRC signaling.

3. The method of claim 1, wherein obtaining the RRC signaling and the data for the EDT comprises:
  obtaining Common Control Channel (CCCH) Service Data Unit (SDU) including the RRC signaling and a Dedicated Traffic Channel (DTCH) SDU including the data for the EDT, the CCCH SDU and the DTCH SDU being generated prior to receiving the Random Access Response from the network device.

4. The method of claim 3, wherein transmitting the RRC signaling to the network device comprises:
  in response to determining that the data for the EDT is not allowed to be transmitted with the RRC signaling, generating, based on the CCCH SDU, a MAC PDU to be transmitted to the network device; and transmitting the MAC PDU to the network device.

5. The method of claim 3, wherein transmitting the RRC signaling and the data for the EDT to the network device comprises:
  in response to determining that the data for the EDT is allowed to be transmitted with the RRC signaling, generating, based on the CCCH SDU and the DTCH SDU, a MAC PDU to be transmitted to the network device; and
  transmitting the generated MAC PDU to the network device.

6. The method of claim 1, wherein the RRC signaling includes an RRC Connection Request or an RRC Resume Request.

7. A terminal device, comprising:
  a processor; and
  a memory coupled to the processor and storing instructions thereon, the instructions, when executed by the processor, causing the terminal device to perform actions, the actions comprising:
  obtaining Radio Resource Control (RRC) signaling to be transmitted to a network device and data for early data transmission (EDT) to be transmitted with the RRC signaling;
  in response to receiving a Random Access Response with uplink grant from the network device, determining, based on the uplink grant, whether the data for the EDT is allowed to be transmitted with the RRC signaling; and
  in response to determining that the data for the EDT is allowed to be transmitted with the RRC signaling, transmitting the RRC signaling and the data for the EDT to the network device by preparing a Media Access Control (MAC) Packet Data Unit (PDU) in accordance with a size of the MAC PDU; or
  in response to determining that the data for the EDT is not allowed to be transmitted with the RRC signaling, transmitting the RRC signaling to the network device.

8. The terminal device of claim 7, wherein the uplink grant indicates an allowable size for uplink transmission, and determining whether the data for the EDT is allowed to be transmitted with the RRC signaling comprises:
  determining a total size of the RRC signaling and the data for the EDT;
  in response to the total size being below the allowable size, determining that the data for the EDT is allowed to be transmitted with the RRC signaling; and in response to the total size exceeding the allowable size, determining that the data for the EDT is not allowed to be transmitted with the RRC signaling.

9. The terminal device of claim 7, wherein obtaining the RRC signaling and the data for the EDT comprises:
  obtaining a Common Control Channel (CCCH) Service Data Unit (SDU) including the RRC signaling and a Dedicated Traffic Channel (DTCH) SDU including the data for the EDT, the CCCH SDU and the DTCH SDU being generated prior to receiving the Random Access Response from the network device.

10. The terminal device of claim 9, wherein transmitting the RRC signaling to the network device comprises:
  in response to determining that the data for the EDT is not allowed to be transmitted with the RRC signaling, generating, based on the CCCH SDU, a MAC PDU to be transmitted to the network device; and
  transmitting the generated MAC PDU to the network device.

11. The terminal device of claim 9, wherein transmitting the RRC signaling and the data for the EDT to the network device comprises:
  in response to determining that the data for the EDT is allowed to be transmitted with the RRC signaling, generating, based on the CCCH SDU and the DTCH SDU, a MAC PDU to be transmitted to the network device; and
  transmitting the generated MAC PDU to the network device.

12. The terminal device of claim 7, wherein the RRC signaling includes an RRC Connection Request or an RRC Resume Request.

13. A non-transitory computer readable medium having instructions stored thereon, the instructions, when executed on at least one processor, causing the at least one processor to:
  obtain Radio Resource Control (RRC) signaling to be transmitted to a network device and data for early data transmission (EDT) to be transmitted with the RRC signaling;
  in response to receiving a Random Access Response with uplink grant from the network device, determine, based on the uplink grant, whether the data for the EDT is allowed to be transmitted with the RRC signaling; and
  in response to determining that the data for the EDT is allowed to be transmitted with the RRC signaling, transmit the RRC signaling and the data for the EDT to the network device by preparing a Media Access Control (MAC) Packet Data Unit (PDU) in accordance with a size of the MAC PDU; or
  in response to determining that the data for the EDT is not allowed to be transmitted with the RRC signaling, transmit the RRC signaling to the network device.

14. The non-transitory computer readable medium of claim 13, wherein the uplink grant indicates an allowable size for uplink transmission, and wherein the at least one processor is caused to determine whether the data for the EDT is allowed to be transmitted with the RRC signaling by:
  determining a total size of the RRC signaling and the data for the EDT;

in response to the total size being below the allowable size, determining that the data for the EDT is allowed to be transmitted with the RRC signaling; and in response to the total size exceeding the allowable size, determining that the data for the EDT is not allowed to be transmitted with the RRC signaling.

15. The method of claim 1, wherein obtaining the RRC signaling and the data for the EDT comprises:

obtaining a first Common Control Channel (CCCH) Service Data Unit (SDU) including the RRC signaling and a second CCCH SDU including the RRC signaling and the data for the EDT, the first and second CCCH SDUs being generated prior to receiving the Random Access Response from the network device.

16. The method of claim 15, wherein transmitting the RRC signaling to the network device comprises:

in response to determining that the data for the EDT is not allowed to be transmitted with the RRC signaling, generating, based on the first CCCH SDU, a first Media Access Control (MAC) Packet Data Unit (PDU); and transmitting the first MAC PDU to the network device.

17. The method of claim 15, wherein transmitting the RRC signaling and the data for the EDT to the network device comprises:

in response to determining that the data for the EDT is allowed to be transmitted with the RRC signaling, generating, based on the second CCCH SDU, a second MAC PDU; and transmitting the second MAC PDU to the network device.

18. The terminal device of claim 7, wherein obtaining the RRC signaling and the data for the EDT comprises:

obtaining a first Common Control Channel (CCCH) Service Data Unit (SDU) including the RRC signaling and a second CCCH SDU including the RRC signaling and the data for the EDT, the first and second CCCH SDUs being generated prior to receiving the Random Access Response from the network device.

19. The terminal device of claim 18, wherein transmitting the RRC signaling to the network device comprises:

in response to determining that the data for the EDT is not allowed to be transmitted with the RRC signaling, generating, based on the first CCCH SDU, a first Media Access Control (MAC) Packet Data Unit (PDU); and transmitting the first MAC PDU to the network device.

20. The terminal device of claim 18, wherein transmitting the RRC signaling and the data for the EDT to the network device comprises:

in response to determining that the data for the EDT is allowed to be transmitted with the RRC signaling, generating, based on the second CCCH SDU, a second MAC PDU; and transmitting the second MAC PDU to the network device.

* * * * *

UNITED STATES PATENT AND TRADEMARK OFFICE
CERTIFICATE OF CORRECTION

| | | |
|---|---|---|
| PATENT NO. | : 11,737,145 B2 | Page 1 of 1 |
| APPLICATION NO. | : 16/767476 | |
| DATED | : August 22, 2023 | |
| INVENTOR(S) | : Jussi-Pekka Koskinen et al. | |

It is certified that error appears in the above-identified patent and that said Letters Patent is hereby corrected as shown below:

On the Title Page

In Column 2, item (57), Abstract, Line 1, delete "medium ae" and insert -- medium are --, therefor.

Signed and Sealed this
Nineteenth Day of March, 2024

Katherine Kelly Vidal
*Director of the United States Patent and Trademark Office*